(12) United States Patent
Majumder et al.

(10) Patent No.: US 10,497,012 B1
(45) Date of Patent: Dec. 3, 2019

(54) CORRECTING FOR LOCATION BIAS USING ARTIFICIAL INTELLIGENCE

(71) Applicant: Amazon Technologies, Inc., Reno, NV (US)

(72) Inventors: Anirban Majumder, Bangalore (IN); Prakash Mandayam Comar, Chennai (IN); Srinivasan Hanumantha Rao Sengamedu, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 663 days.

(21) Appl. No.: 15/073,289

(22) Filed: Mar. 17, 2016

(51) Int. Cl.
*G06Q 10/06* (2012.01)
*G06Q 30/02* (2012.01)
*G06Q 30/06* (2012.01)
*G06N 7/00* (2006.01)
*G06N 20/00* (2019.01)

(52) U.S. Cl.
CPC ......... *G06Q 30/0201* (2013.01); *G06N 7/005* (2013.01); *G06N 20/00* (2019.01); *G06Q 30/0641* (2013.01)

(58) Field of Classification Search
CPC ......... G06Q 10/06; G06Q 30/02; G06Q 30/06
USPC ....................................... 705/7.29
See application file for complete search history.

(56) References Cited

U.S. PATENT DOCUMENTS

| | | | | |
|---|---|---|---|---|
| 2015/0199627 A1* | 7/2015 | Gould | ............... | G06Q 10/0631 705/7.12 |
| 2015/0302475 A1* | 10/2015 | Zachariah | .......... | G06Q 30/0256 705/14.54 |
| 2016/0189278 A1* | 6/2016 | Parpia | ............... | G06Q 30/0635 705/26.81 |

\* cited by examiner

*Primary Examiner* — Nga B Nguyen
(74) *Attorney, Agent, or Firm* — Hogan Lovells US LLP

(57) ABSTRACT

The effect of position bias on content performance can be determined in part using artificial intelligence and computer learning. Performance data can include the frequency with which an action, such as a purchase, occurs in response to an instance of content being displayed. The content can be associated with a node at a lowest level of an offering hierarchy, and performance data from the various levels can be rolled up to higher level nodes to obtain sufficient data to for accurate position bias determinations. A bias model can be trained using the data from the various levels, where the training determines weightings for the bias determinations of each level. Once the position bias for an offer is determined, a normalized performance value can be obtained that does not include the effects of the bias. The normalized values can be used to select and place content based on actual performance.

20 Claims, 8 Drawing Sheets

CORRECTING FOR LOCATION BIAS USING ARTIFICIAL INTELLIGENCE

BACKGROUND

Users are increasingly turning to content in electronic form, including items offered for sale through various electronic channels. When a user searches or browses for content, such as items offered for sale through an electronic marketplace, relevance information is generally utilized to determine which content to display, as well as the order in which to display that content. For items available through an electronic marketplace, performance metrics such as likelihood of a view or purchase can be used for such ranking and determinations as well. While performance data can be determined by analyzing the actions of customer with respect to instances of displayed content, the performance data will be impacted at least in part by the position at which the content is displayed. For example, items at the top of the list might be more likely to be selected than items at the bottom of a list, and items towards the right of the display in at least some cultures may be less likely to be selected than items towards the center or left of the display. While this bias can be eliminated by displaying the same content multiple times at various different locations and comparing the relative performance, there often will not be the opportunity to collect enough data for accurate determinations of performance bias. Further, for content such as search results where items are ranked by relevance there might be little ability to re-rank or reposition the items of content for reasons separate from relevance.

BRIEF DESCRIPTION OF THE DRAWINGS

Various embodiments in accordance with the present disclosure will be described with reference to the drawings, in which.

DETAILED DESCRIPTION

Figure 1:
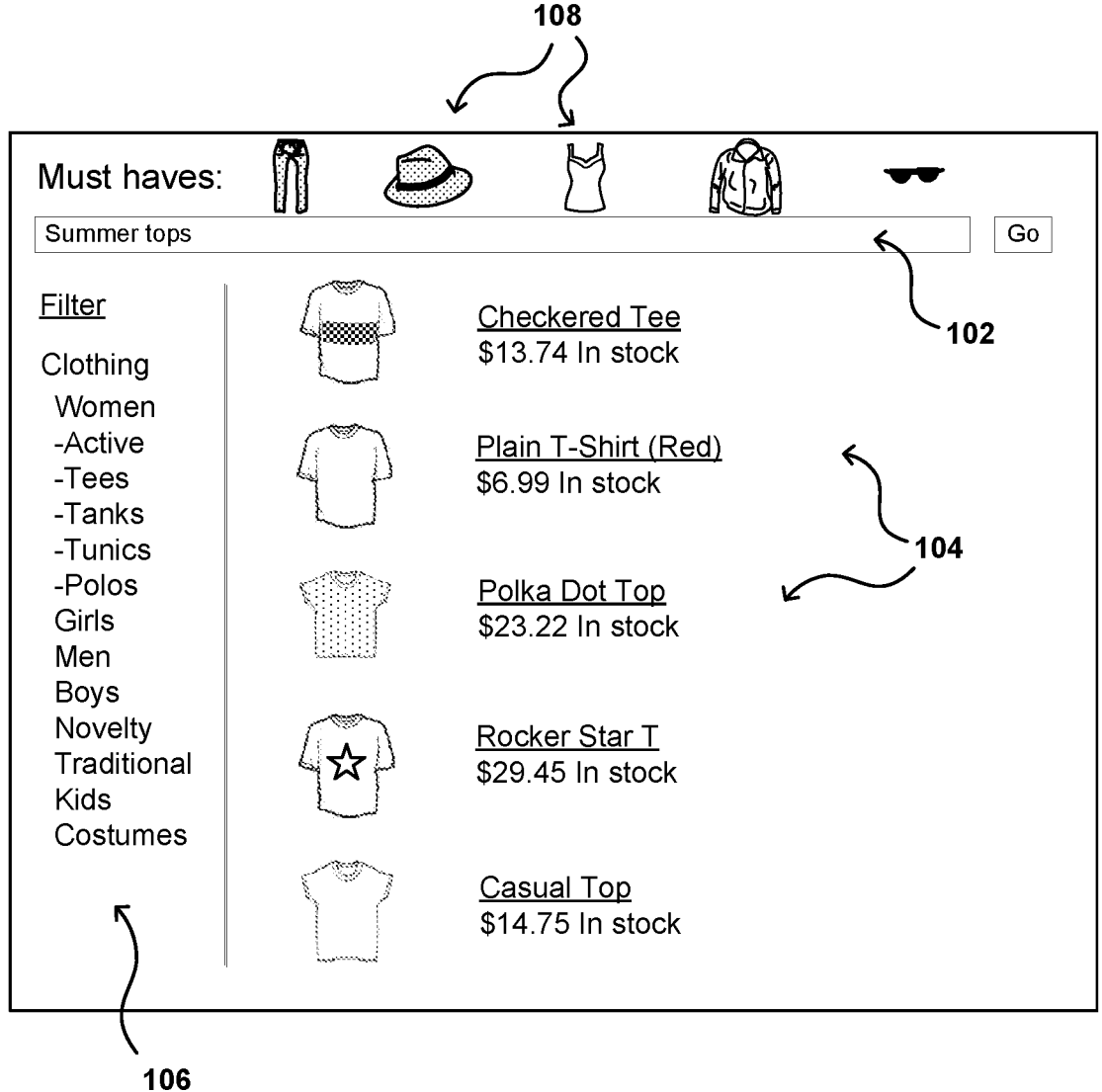
FIG. 1 illustrates a first example display in which content for various offerings is displayed that can be utilized in accordance with various embodiments.

Systems and methods in accordance with various embodiments of the present disclosure may overcome one or more of the aforementioned and other deficiencies experienced in conventional approaches to providing content in an electronic environment. In particular, various embodiments attempt to correct for presentation bias when using one or more performance metrics to determine content to be displayed, as well as display locations for that content. Content displayed on a computing device through an application such as a Web browser is often displayed in a determined arrangement, whether in a list, array, or specified pattern. These arrangements are often used to display content such as search results, recommendations, and deals or offers for various items available for consumption. Each instance of a particular piece of content being displayed is referred to as an impression, and the performance of an instance of content can be determined based upon the number of specified actions taken per number of impressions. For example, a common performance metric is a click through rate (CTR), which is generally a percentage of the number of impressions that resulted in a user "clicking" on (or otherwise selecting) an instance of content in order to, for example, obtain additional information. Performance metrics can also include the number of resulting purchases per impression, the number of times an item is added to a virtual shopping cart per impression, and the like.

Content to be displayed in an environment such as an electronic marketplace, content will often be selected based upon some measure of relevance. This can include, for example, relevance to a submitted query, relevance to a page to be displayed, or relevance to a user session in which the content is to be displayed. When determining which of the relevant items to display, however, the system might look to various performance metrics in order to display content that is most likely to result in a conversion, or an action such as a view, click, add-to-cart, or purchase, among other such actions. This can be particularly useful for displays such as recommendations and deals or special offers. Presenting content that is selected and arranged based on performance metrics can help to maximize the potential revenue to be obtained from the display.

While such an approach can help to improve overall revenue, the determination of performance is not optimal in at least some situations. The relevance for an instance of content depends not only on the observed performance metric, but also on the position of the content as displayed. For example, items towards the top of a list might be more likely to be selected than items towards the bottom of a list, and items towards an edge of the display might be less likely to be selected than items towards the center of the display, etc. Thus, the apparent performance of an instance of content can be greatly dependent upon the position where that content is displayed. This can be particularly relevant for arrangements or groupings of content where there is limited mobility of the content to different locations, such as where the content is part of a fixed image or list ranked on other criteria.

Approaches presented herein attempt to remove, or at least minimize, the effect of this "position bias." In at least some embodiments, it can be desirable to rank or select content based on normalized" performance values where the impact of the performance bias has been removed. If sufficient data is available for a particular instance of content, whereby performance can adequately be determined at the relevant positions, then the position bias for that particular content can be removed from the performance value. In many cases, however, there will be insufficient data to provide an accurate bias determination. As mentioned, there may not be data for many of the positions, or not enough data overall for that particular offering, to estimate the presentation bias and separate the true item relevance from the estimated presentation bias.

In at least some embodiments, problems with insufficient data can be addressed by utilizing the information available for related offers. For example, the offers can be part of an offering hierarchy. For products offered through an electronic marketplace, this can include products of certain brand that are part of a general or global classification, such as apparel or electronics, as well as part of a category such as casual attire and a sub-category such as t-shirts, among various other such options. While there may not be enough data for accurate bias determinations for a specific t-shirt, for example, going up one level in the offering hierarchy to all t-shirts will generally provide more data, as will going up to the category level for casual attire and the global classification for attire. While the additional data will be able to be used to make more accurate bias determinations at each of these levels, the relevance of that bias factor to the specific offer will vary. Thus, approaches in accordance with various embodiments can attempt to train a model or function that is a combination of the relevance and position bias at each level in order to determine the appropriate weightings and other such factors to determine the appropriate position bias for a given offering using the available data for other levels of the offering hierarchy.

FIG. 1 illustrates an example display 100 of content that can be presented in accordance with various embodiments. This example illustrates content for a set of items offered for consumption (i.e., purchase) through an electronic marketplace. As known for such displays, a search query can be received to a search field 102 that can cause related items to be located and displayed as a list of search results 104 that are typically ranked by relevance. Similar displays can be obtained through other mechanisms as well, such as by receiving a selection to browse a page associated with a category of items. The display shows an example listing of a relevant portion 106 of an offering hierarchy, where the content displayed can be updated by going "up" the hierarchy to a parent category or drilling "down" into the hierarchy by selecting a sub-category. This display also includes a set of recommendations 108 that may or may not be relevant to the particular search query. These recommendations can be selected in a variety of ways, such as by selecting items that are relevant to the user or by selecting a set of offers that are fixed and will be displayed on all pages displayed over a period of time, among other such options.

Figure 2:
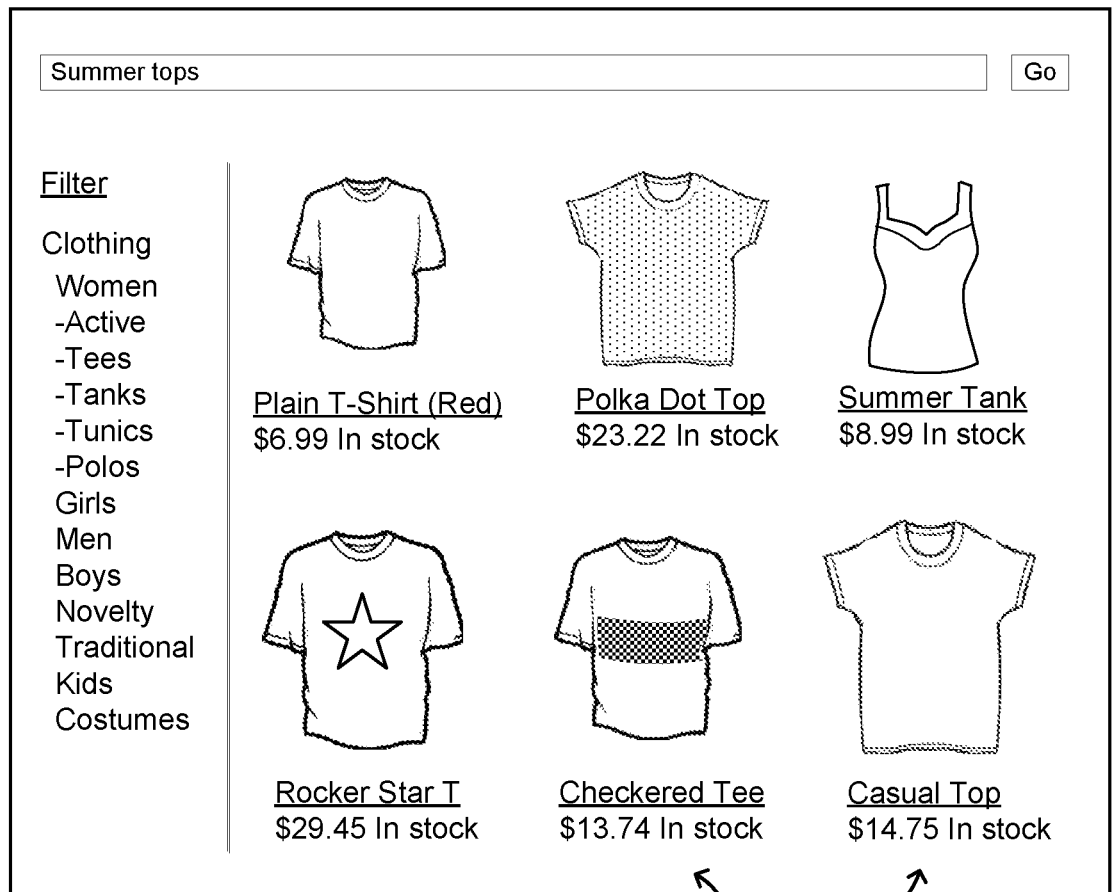
FIG. 2 illustrates a second example display in which content for various offerings is displayed that can be used in accordance with various embodiments.

FIG. 2 illustrates another example display 200 wherein instances of content 202 corresponding to various offerings are displayed in an array. Various other patterns and arrangements can be used as well. In this example, the position of each offer on the display will also typically be determined based at least in part upon a relevance of the products to the query, user, or other such determining factor. As mentioned, however, for environments such as an electronic marketplace it can be desirable to select and place at least some of the content in a way that will help drive revenue for the marketplace. One way to accomplish this is to attempt to determine the relative performance of potential items to be displayed, and then select and/or position the offers for those items based at least in part upon the performance data. Ranking and measuring the performance (e.g., click-through rates or purchase rate) of items plays an important role in applications such as search, advertising, and content placement. For advertising, suggested content, and other such offerings, which typically correspond to a product or service available for some type of compensation, this can involve presenting several of these offers or "deals" on a common display, such as a webpage or mobile application display. In order to present the deals that are most likely to be of interest to a potential customer, and thus result in a consumption (i.e., a purchase, lease, rent, or download), the deals can be ranked or ordered based at least in part upon their estimated consumption probabilities, although views, clicks, impressions, or other such metrics can be used as well for various types of content and deals.

In some situations the ranking is based at least in part upon an estimated relevance or popularity of the deal with respect to a certain page, query, type of user, or other such factor. These values are often determined at least in part by monitoring or tracking the number of actions taken by users with respect to displays of each respective deal (or similar types of deals). In many cases, this can include a click through rate (CTR) or other such metric that identifies, for example, the frequency with which users clicked on content for a displayed deal when that deal was displayed to a user (or at least on displayed on a display screen or other such mechanism). Often, real-world constraints do not allow an offer to be presented at many different positions. For example, a hot deals page might include items that are ranked daily such that the positions of those items remain static throughout the day. Various other deals can be short lived and the deal position changes only when new deals are activated, such that their positions may also not vary much over the relevant period. The same can hold true for search, where search results within a category may have limited fluctuation in position. Thus, the items are presented from few positions, which can make it difficult to estimate and remove the position bias.

Figure 3A:
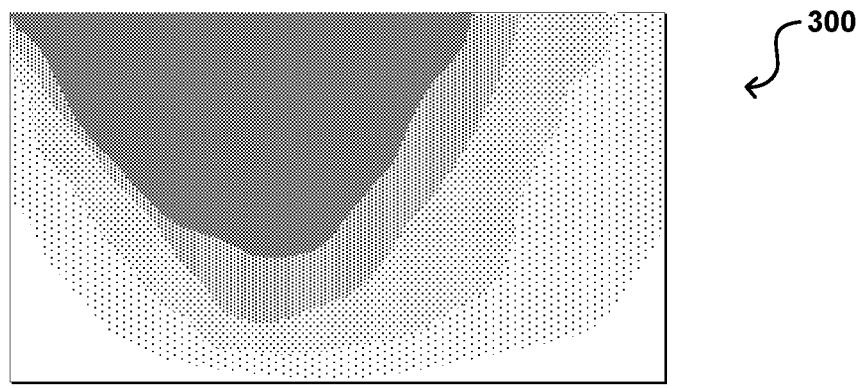
FIGS. 3A, 3B, and 3C illustrate example heat maps, or distributions of position bias, that can be determined using approaches in accordance with various embodiments.
Figure 3B:
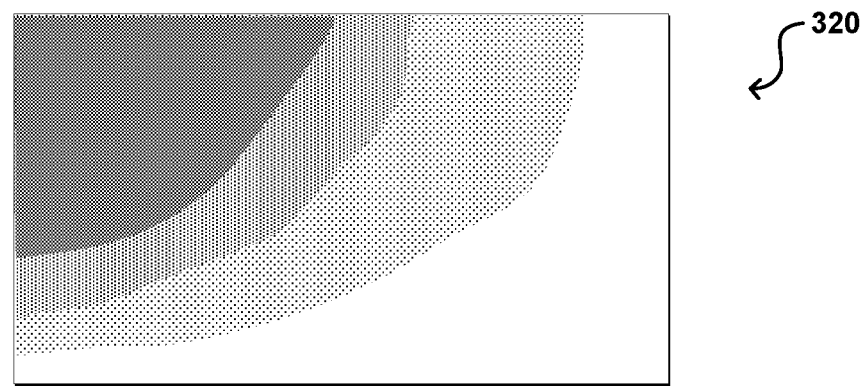
Figure 3C:
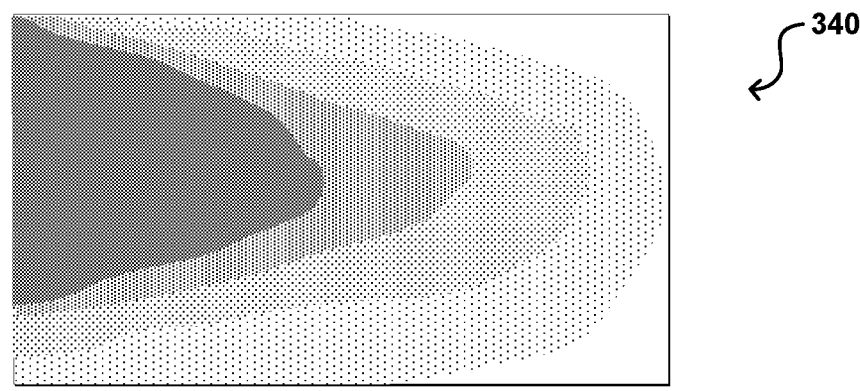

FIGS. 3A, 3B, and 3C illustrate example effects of position bias that can be determined for various types of display. For example, FIG. 3A shows a "heat map" view 300 of the relative probability of a user clicking on the same deal, offer, or other such content based upon the position where that content is displayed. In many Western cultures, as an example, people tend to read from left to right and from the top down, although algorithms discussed herein can be applied in other settings as well with minimal changes, as may relate to Arabic or Japanese cultures, among others. People looking at computer screens also tend to look more to items towards the center of the screen than near the edges of the screen. Thus, the heat map 300 of FIG. 3A illustrates an example probability distribution based on display location for one type of display of content, where darker regions have a higher performance bias than lighter shaded regions. FIG. 3B illustrates a potential bias distribution 320 where items toward the top left are much more likely to be acted upon than items towards the lower right, as may occur for an array display. FIG. 3C illustrates a potential bias distribution 340 where items toward the left are much more likely to be acted upon than items towards the right, as may occur for a horizontal display. Various other arrangements and distributions can occur as well within the scope of the various embodiments. The position bias, or popularity variation with display location, can be determined in part by placing an item of content at various locations and determining the popularity, or frequency of action, for that item at each of the various locations. Attempts to determine the actual popularity of content itself can take into account and/or adjust for the presentation bias included in the tracked data. While techniques such as COEC and a Gamma-Poisson model-based approach exist for addressing presentation bias, approaches discussed and suggested herein can provide improved results, particularly in the content of the types of content and displays discussed herein.

Approaches in accordance with various embodiments can utilize one or more algorithms to correct for presentation bias. These algorithms can include, for example, a Beta-Poisson model and a hierarchical prior (HIER) for correcting for presentation bias. In at least some embodiments, variational inference can be used to infer the parameters of the Beta-Poisson model. Such approaches have been shown to outperform previous techniques discussed elsewhere herein.

In one example, customer might search for content on a website associated with an electronic marketplace where various items are available for consumption. In many situations, the items will be presented as a list, such as a list of search results, deals, or recommendations. The performance of each of these items can be determined and or defined in a number of different ways, as may correspond to an average or overall click-through rate (CTR), add to cart rate, or purchase rate, among others. The items in the list can then be selected and/or ranked based at least in part upon their respective performance values. For example, an item of content with the highest performance value might be most likely to result in a purchase by the user, and thus might be ranked first and displayed at the top of the list. While this may be a reasonable scheme for certain systems, the performance data will be affected by the position of the item in the list in addition to the appropriateness or relevance of the item in the list. Accordingly, equally relevant items might have lower performance values at higher rank values in the list. The observed performance values (i.e., CTRs) are biased based at least in part upon the position where there are displayed. A more accurate ranking would be obtained by removing the position bias portion of the performance value. In order to remove (or at least minimize the impact of) this position bias, a generative model can be used that uses appropriate priors for the components involved. Various other factors can influence the performance values as well. For example, certain types of users look only at a first page or selection of deals and rarely view beyond that selection. Other types of customers visit multiple pages and have roughly the same probability of purchasing a deal from any of those pages. By determining a type of user, a page-based or user-intent based position bias can be accounted for as well. For example, the user could be a "hunter" type of user who visits multiple pages and is less amenable to position bias or a "seeker" who visits the first few pages only and is impacted by the display position. There can also be different types of arrangements of content to be displayed. For example, in applications such as web browsing and product search, the results are frequently presented vertically one after another. In applications such as image and video search, the results are often presented in a two dimensional grid or array. For certain deals or recommended content, the results may be presented in a horizontal layout. Various other layouts can be utilized as appropriate for different types of content. The position bias can be eliminated for these and other arrangements as well using approaches discussed and suggested herein.

In order to model presentation bias, it can be important to understand how location can affect the performance of an instance of content. Any deal that is displayed has a chance of being selected by a customer. As discussed above, in at least some cultures the likelihood of being viewed and/or selected decreases as the position approaches the right edge of the display (from the perspective of the viewer). It should be understood that directions such as up, down, left, and right are not requirements for all embodiments unless otherwise specifically stated. An example examination model can assume that the customer samples a position to be examined. This step can depend at least in part upon a positional prior distribution and can be independent of the quality of the deals. An assumption can also be that a customer makes a purchase decision depending on whether the customer likes the deal at that position. More precisely, for a deal d at position p, the customer action of purchase A is modeled through a hidden variable E denoting whether the deal was examined or not, as may be given by:

$$Pr(A \mid d, p) = \sum_{E \in \{Yes, Np\}} Pr(A \mid E, d, p) * Pr(E \mid p)$$
$$= Pr(A \mid d, E = Yes) * Pr(E \mid p)$$

The last step relied upon a couple assumptions about independence. First, if a deal is not examined, the deal will not be purchased. But if the deal examined, the purchase decision depends on the deal alone, as given by $\alpha_d$. Consequently, the probability of purchase is a product of two factors: $\alpha_d$ and $\beta_d$. The purchase rate (PR) of a deal can be defined as the probability that it will be purchased if it was seen:

$$\alpha_d = Pr(A \mid E = Yes, d)$$

$$\beta_d = Pr(E \mid p)$$

from the equation above. Under the assumption that $\beta_1 = 1$, or that the first position is always examined, PR is same as the number of units purchased per impression from position 1. An estimation of PR is important, as it provides a simple basis for comparing and ranking deals.

In order to capture the presentation bias, various embodiments utilize a probabilistic model herein referred to as a beta-poisson model. In developing the model, one assumption can be that, as discussed above, the observed purchase price can be factored as:

$$Pr(A \mid d, p) = \alpha_d * \beta_p$$

If the number of purchases is given by $A_{d,p}$ and the number of impressions or views is given by $I_{d,p}$, for a given deal d at a specified position p, then assuming independent purchase decisions $A_{d,p}$ would follow a binomial distribution given by:

$$p(A_{d,p} \mid \alpha_d, \beta_p) = \binom{I_{d,p}}{A_{d,p}} (\alpha_d \beta_p)^{A_{d,p}} (1 - \alpha_d \beta_p)^{I_{d,p} - A_{d,p}}$$

A beta prior can be imposed on the deal factors as given by:

$$\alpha_d \sim Beta(1, \gamma)$$

Empirically, the histogram of deal PR is skewed towards zero, which is captured through the Beta distribution. The shape parameter $\gamma$ controls the mean of the distribution. Another advantage of using a Beta distribution is to ensure that $\alpha_d$ can be interpreted as a probability. In general, the prior will help with regularization. That is, deals with a high degree of data sparsity (i.e., few impressions or purchases) will benefit from the prior leading to better generalization. It can be noted that there is a coupling between the $\alpha$ and $\beta$ factors in the above expression:

$$(1 - \alpha_d \beta_p)^{I_{d,p} - A_{d,p}}$$

The exact posterior inference problem, given by:

$$Pr(\alpha|\beta;I,A,\gamma)$$

then turns out to be intractable, even though a conjugate prior distribution is incorporated. To circumvent this difficulty, the Poisson Limit Theorem can be applied and the binomial distribution approximated as a Poisson as given by:

$$p(A_{d,p}|\alpha_d\beta_p) \approx (I_{d,p}\alpha_d\beta_p)^{A_{d,p}} * \frac{e^{-I_{d,p}\alpha_d\beta_p}}{A_{d,p}!}$$

The following generative process can then outline the working of the model. For example deal d, the process can sample $\alpha_d$~Beta(1,$\gamma$). For each (d,p), the process can sample $A_{d,p}$~Poisson($I_{d,p}*\alpha_d*\beta_p$). The complete joint distribution then can be given by:

$$p(A,\alpha|\beta;I,\gamma) = \prod_{d,p}(I_{d,p}\alpha_d\beta_p)^{A_{d,p}} * \frac{e^{-I_{d,p}\alpha_d\beta_p}}{A_{d,p}!} * \prod_d \gamma(1-\alpha_d)^{\gamma-1}$$

It then can be desirable to determine the optimal parameter setting $\beta^*$ that maximizes the marginal likelihood $p(A|\beta;I)$ as well as the posterior distribution on a, as given by:

$$Pr(\alpha|\beta^*;A,I,\gamma)$$

In some embodiments, an EM algorithm can be used to estimate both. The posterior calculation in E-step can be difficult due to the interaction between the $\alpha$ and $\beta$ variables, such that in some embodiments inference techniques can be utilized. Given the non-conjugacy of Poisson and Beta distributions, sampling based techniques are unlikely to work well in practice, such that a variational inference can be utilized instead in at least some embodiments.

With respect to a variational inference, various embodiments can utilize the general paradigm of variational approximation suited to probabilistic inference, such as may include Variational Bayes methods. If y denotes the observed variables, z denotes the latent variables, and $\theta$ represents the parameters of a model. The marginal log likelihood of observation y can be lower bounded by introducing another distribution q(z) over the latent variables and then applying Jensen's inequality, as may be given by:

$$\ln p(y,\theta) =$$

$$\ln \int p(y,z|\theta)dz = \ln \int q(z)\ln\left(\frac{p(y,z|\theta)}{q(z)}\right)dz \geq \int q(z)\ln\left(\frac{p(y,z|\theta)}{q(z)}\right)dz$$

Equality is attained when q(z)=p(z|y,$\theta$) and at that point, the lower bound is maximized with respect to the variational distribution q. A significant benefit can be derived from a factored representation of q, as may be given by:

$$q(z) \approx \Pi_{z_i \in z}q(z_i|\zeta_i)$$

where $\zeta_i$ are additional variational parameters that can be tuned in order to maximize the lower bound. It can be shown that the difference between the left and right side of the inequality in Jensen's inequality equation, above, is in fact the KL divergence between q and the true posterior. Therefore, maximizing the lower bound has the same effect as minimizing the KL divergence. The right-hand side of the inequality equation can be further simplified to obtain, for example:

$$\ln p(y|\theta) \geq E_{q(z|\zeta)}[\ln p(y,z|\theta)] + H(q(z|\zeta))$$

L($\zeta$) can be used to denote the right hand side and H($\bullet$) can be the entropy function. For purposes of the analysis, q($\alpha$) can follow a Beta distribution as may be given by:

$$q(\alpha) = \prod_d \text{Beta}(\alpha_d | 1, \lambda_d)$$

The lower bound can then be maximized in the simplified equation by setting the following derivative to zero:

$$\frac{\partial L}{\partial \lambda_d} = 0$$

If q($\alpha|\lambda^*$) is the optimal variational distribution at the end of E-step, then in the M-step the following equation can be maximized with respect to the model parameters $\beta^2$:

$$E_{q(\alpha|\lambda^*)}[\ln p(A,\alpha|\beta;I,\gamma)]$$

The following multiplicative updates can then be applied until convergence:

$$E\text{-step}: \lambda_d' \leftarrow \frac{\gamma + \sum_p I_{d,p}\beta_p}{1 + \sum_p A_{d,p}}$$

$$M\text{-step}: \beta_p' \leftarrow \frac{\sum_d A_{d,p}}{\sum_d \frac{I_{d,p}}{1+\lambda_d}}$$

The value of $\alpha_d$ can be estimated as the mean of $q(\alpha_d|\lambda^*_d)$, which is given by $1/(1+\lambda^*_d)$. Further, $\gamma$ can be treated as a constant that is not considered for optimization. One can also apply various hyper-parameter optimizing techniques to automatically learn an optimal setting of $\gamma$ in some embodiments.

As mentioned, however, in various embodiments it is desirable to leverage the content hierarchy (i.e., product hierarchy). An alternative method to estimate $\beta p$ from the data can use additional information about each deal from the hierarchy. Each deal can belong to a unique combination of global classification, product category, and product subcategory. This information about a deal can be used to roll up the sparse $I_{d,p}$ into dense vector (indexed with respect to p), where the views or impressions are aggregated for each position with respect to global classification, category, and subcategory. If $I_{s,p}$, $I_{c,p}$, and $I_{g,p}$ denote the impression counts for position p with respect to subcategory, category, and global classification, respectively, and $A_{s,p}$, $A_{c,p}$, and $A_{g,p}$ denote the corresponding conversions (i.e., add-to-cart clicks), then the following equations hold true for all values of deal d and position p:

$$I_{s,p} = \sum_{d \in s} I_{d,p} \text{ and } A_{s,p} = \sum_{d \in s} A_{d,p}$$

$$I_{c,p} = \sum_{d \in c} I_{d,p} \text{ and } A_{c,p} = \sum_{d \in c} A_{d,p}$$

$$I_{g,p} = \sum_{d \in GL} I_{d,p} \text{ and } A_{g,p} = \sum_{d \in GL} A_{d,p}$$

where $d \in s$, $d \in c$, and $d \in g$ denote a deal d belonging to subcategory s, category c and global classification g, respectively. It should be apparent that the impression count $I_{\cdot,p}$ per position increases while ascending the product hierarchy, resulting in robust estimation of position bias.

One way to use this additional information is to estimate the position bias factor $\beta_p$ at different levels in the product hierarchy and use them as prior in the loss function set forth above. Instead, the position bias factor $\beta_p$ can be learned jointly over the product hierarchy by optimizing the following objective function:

$$\gamma 1 \sum_{d,p} (A_{d,p} - I_{d,p}\alpha_d\beta_p)^2 + \gamma 2 \sum_{s,p} (A_{s,p} - I_{s,p}\alpha_s\beta_p)^2 +$$
$$\gamma 3 \sum_{c,p} (A_{c,p} - I_{c,p}\alpha_c\beta_p)^2 + \gamma 4 \sum_{g,p} (A_{g,p} - I_{g,p}\alpha_g\beta_p)^2$$

Each term in the objective function models the relationship between the impression and conversions (i.e., add-to-cart clicks) with respect to the individual levels in the product hierarchy. The position bias factor $\beta_p$ remains constant across all the terms (i.e., levels in product hierarchy) and the relevance factor is estimated for each level separately. The weight $\gamma_i$ controls the influence of each level in estimating the position bias Pi. In certain embodiments, all the $\gamma_i$ were set to 0.25.

Various approaches can be used to assess the accuracy of such a model in predicting the normalized purchase rate. One way to evaluate a position correction model is to use impression logs as training data and evaluate the probability of purchase/no-purchase on the remaining impressions. However, since it can be more interesting in at least some embodiments to accurately predict the normalized purchase rate or the variables $\alpha_d$, a methodology to evaluate model performance can consider the set of deals that appeared in position 1 with a minimum number of impressions, such as 10,000 impressions. Moreover, each deal from this set must appear in at least a minimum number (i.e., 10) of other positions. A number (i.e., 100) of deals can be randomly selected that constitute the test set. Their impression and conversion (i.e., add-to-cart) data can be held from position 1. The remaining data can be used for training the model. In this example, $\alpha_d$ can be predicted for each deal d in the test set and the error calculated. These steps can be repeated multiple times and the average error calculated. When reporting error between actual purchase rate at position 1 and the predicted purchase rate in this example, two types of error metrics are used: the Root-Mean-Squared-Error (RMSE) and the KL divergence. In training the Beta-Poisson model, the hyper-parameter $\gamma$ can be set by letting $\upsilon$ denote the mean observed purchase rate of deals where the average is taken over deals in the training set. Setting $\gamma = (\theta^*\upsilon)/(1-\upsilon)$ enables the decay factor $\theta$ to be estimated through cross-validation on a separate validation set. Relative to other models, the Beta-Poisson model achieves minimum error implying that the estimated purchase rates are well calibrated. What seems to help the Beta-Poisson model is the prior on deal factors—there are a significant number of deals with few impressions leading to over or under prediction of purchase rate. The presence of prior, in case of limited data, regularizes the estimation of purchase rates.

The predicted scores can also be used to rank deals in at least some embodiments. The position 1 purchase rate can be used as the ground-truth ranking criteria and each model can be evaluated on various ranking metrics. The test deals can be partitioned based on factors such as date, and for each day two ranked lists can be constructed, including the true rank (the ordering of deals based on their position 1 purchase rate and the predicted rank (based on the predicted purchase rate). Such experimentation demonstrates that the Beta-Poisson model scores well on all metrics and achieves significant improvement over the baselines. Similar results are obtained by comparing the predicted purchase rate with the sales rank, or other such metric.

Although the bias correction step can be important in building an accurate purchase rate model, it is not the end goal in at least some situations. For example, an electronic marketplace might release hundreds of new deals which only run for a limited period of time, as may be on the order of hours. Therefore, cold start is a perennial issue in deals ranking and to address that systematically, one can utilize a ranking function utilizing various deal and item features. Another application relates to the ranking of feed items, such as from a feed of stories selected based on user interests. In such a system, people can contribute stories and interact (i.e., like, share, or comment). Given the dynamic nature of content, each story may be relatively short-lived. The position bias correction can apply to such a feed of items as well, to indicate the relative performance or interest of each item. For such purposes, the normalized performance rate can be used as a target variable to train a ranking function.

Machine learning models are known for search result ranking, and current systems in web search ranking employ gradient boosted decision trees applied to pairwise preferences. A simpler approach is to train a logistic model. The benefit of position bias correction in predicted deal purchase rates can be quantified. The predictive performance can be greatly enhanced by incorporating powerful features, optimizing the training hyper-parameters, and by using better models suited for ranking (e.g. GBDT), among other such options. A number of deal and item related features can be used, with non-linearity in the feature space introduced through quantile binning and feature interaction. Deal features can include values such as deal price, discount, and teasing duration. The item features can include information such as review ratings, number of reviews, and sales rank. The nodes of the item hierarchy can include global (GL), category, sub-category, and brand name, among other such options. A baseline algorithm can be the model trained on the observed purchase rate without any bias correction. For this experiment, an additional number of days of data can be collected after the training period. A logistic regression model can be built using the training data measured on the test set. A logistic model can also be trained using the normalized purchase rate. From running such a test, a key observation is that position bias correction helps in predicting deal purchase rates with the bias correction techniques reporting significant gain over the un-normalized versions.

Another benefit to the approaches discussed and suggested herein comes from the way in which the normalized or bias-corrected performance metric is utilized. By way of comparison, conventional systems often utilize a normalized performance value, such as the normalized click through rate (CTR), as a feature for a ranking function. The content in these domains typically has a much longer lifetime, such as days or weeks, when displayed in advertising, search results, or other such domains. The impression data collected over an initial number of days can have a correction applied to attempt to obtain a normalized CTR value, which can then be used to rank the various instances of content. Approaches in accordance with various embodiments can work in these longer-duration domains, but can also provide accurate results in domains where the content is much shorter lived, such as where offers might only be available for a limited time or items in a feed only appear for a limited time, such as on the order of a few hours or less. If one was to use the normalized CTR for such content, the limited period might have run out or expired by the time the normalized value is determined. Instead, approaches presented herein use bias-corrected performance as a target variable in the machine learning models. The decoupling of the bias correction step from the online scoring step is also beneficial from at least a system point of view, as it helps to iterate more quickly on the various bias correction techniques without impacting the production code for the ranking, among other such advantages.

Figure 4:
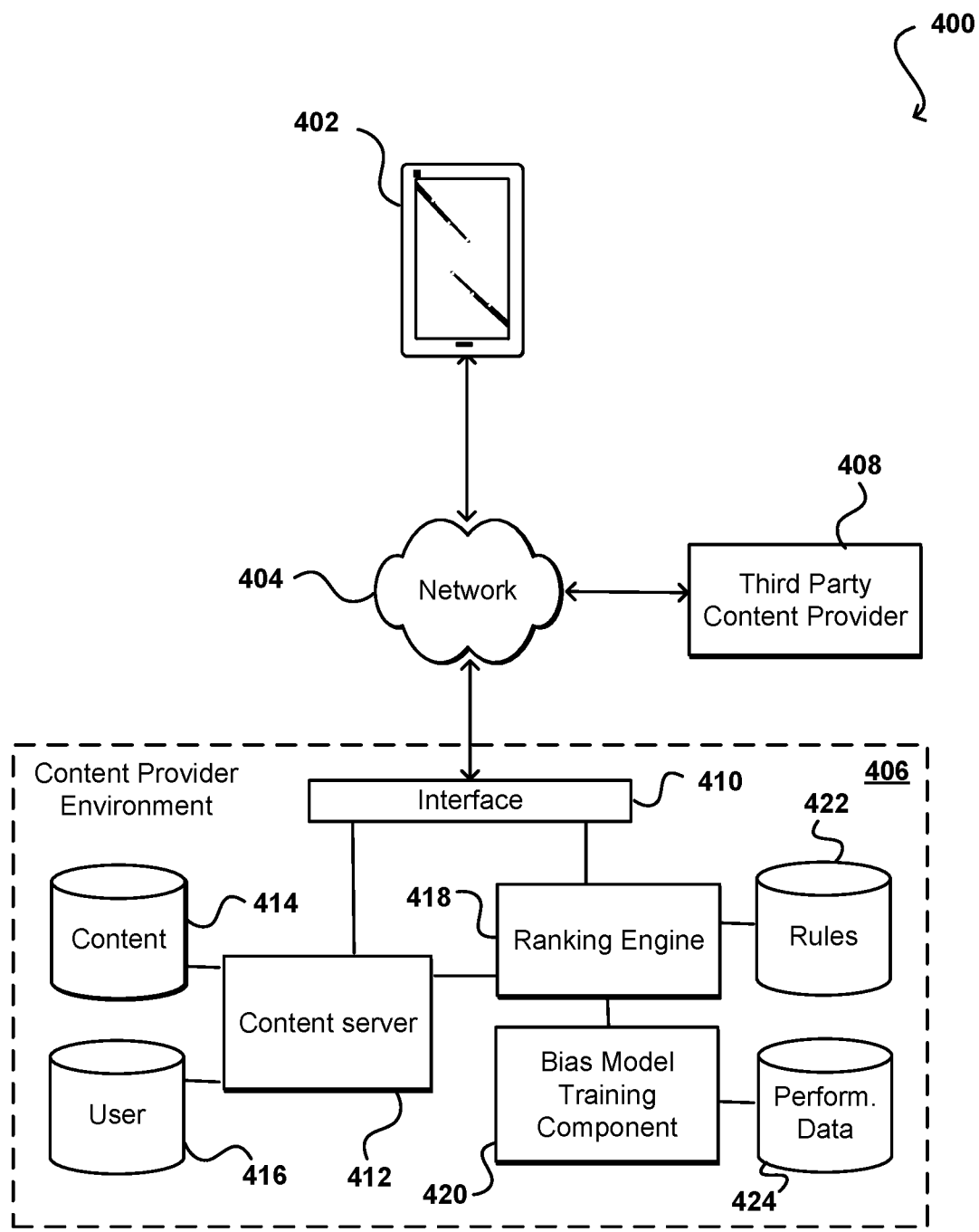
FIG. 4 illustrates an example environment in which various embodiments can be implemented.

FIG. 4 illustrates an example environment 400 in which aspects of the various embodiments can be implemented. In this example, a computing device 402 is able to make a call or request across one or more networks 404 to a content provider environment 406. The network(s) can include any appropriate network, such as the Internet, a local area network (LAN), a cellular network, an Ethernet, or other such wired and/or wireless network. The content provider environment 406 can include any appropriate resources for providing content from a resource provider, as may include various servers, data stores, and other such components known or used for providing content from across a network (or from the "cloud").

In this example, a call received to the resource provider environment 406 can be received by an interface layer 410 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content servers 412, which can obtain the content from a content data store 414 or other such repository to be sent back across the network(s) to the computing device. In some embodiments, information for the request might also be compared against user data in a user data store 416 or other such location do determine, for example, whether the user has access rights to that content.

For content, such as offers, where it may be desirable to prioritize by performance, it can be desirable to train a bias model as discussed herein. A data store 424 can store the relevant action and position data, which can be analyzed by a training component 420 that can use the data to train, test, and/or refine the model over time. This can include using the data for various levels of the offering hierarchy to increase the size of the data pool as discussed and suggested elsewhere herein. When a request for content is received, the content server 412 can communicate with a ranking engine 418, or other such system or service, to attempt to determine a normalized ranking score for the offers that can be used by the content server to determine how to position the respective offers. In some embodiments the ranking engine might consult one or more rules stored in a rules data store 422, or other such location, for assistance in properly ranking the offers. For example, some types of content might be ranked based on purchases, while other types might be ranked based on views or clicks, or combinations thereof. The rules also might specify minimum levels of certainty, minimum amounts of data, or other such criteria relevant to the ranking. The content server 414 can then use the ranking data to generate the appropriate page data to send to the client device 402. As mentioned, in some embodiments the content might be received from a third party provider 408, or the content might be provided to the client device using a link to content provided by the third party provider, among other such options.

Figure 5:
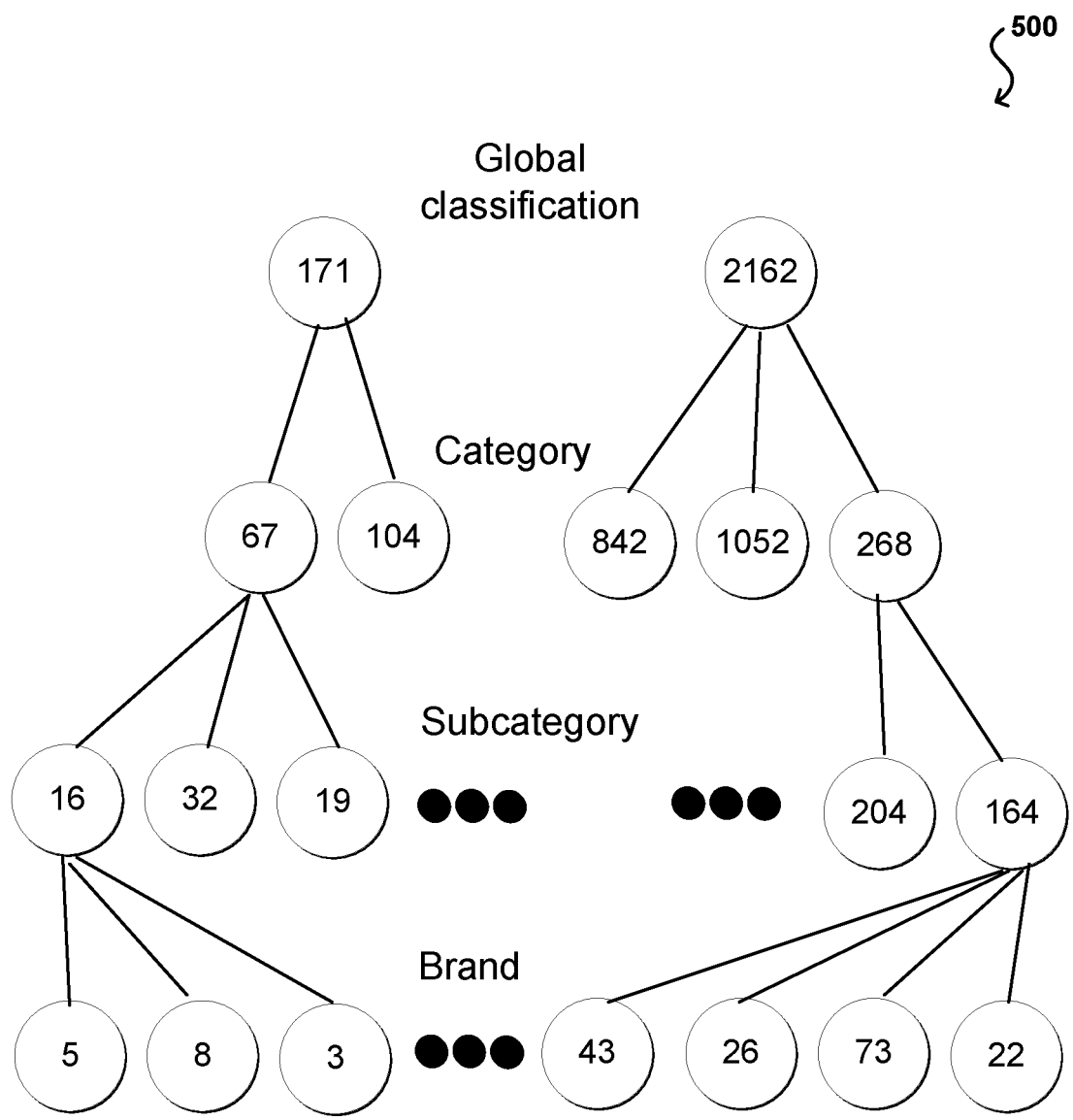
FIG. 5 illustrates an example offering hierarchy that can be utilized in accordance with various embodiments.

FIG. 5 illustrates an example offering hierarchy 500 that can be utilized in accordance with various embodiments. In this example, items offered for consumption are classified according to a hierarchy of categories and classifications. The highest level are global classifications as discussed previously, which can include broad classifications such as apparel, automotive, electronics, digital content, and the like. Below that is a level of category nodes, which can correspond to categories such as appliances, outerwear, shoes, and the like. Below that is a layer of subcategory nodes, which can correspond to subcategories such as running shoes, blenders, and sport coats, among others. There can be other layers of classifications as well, as may correspond to brand names or other such classifications. Each offer or item will correspond to a node at each level, and each node of a given level will correspond to one or more nodes of a lower level. As illustrated, each node at the lowest level may have a relatively low number of data points with respect to item or offer performance. The corresponding node of the next highest level will have more data points, in general, as it will include the data from all the corresponding nodes of the lower level. This continues up the hierarchy until reaching the global classification layer, where each node may have a relatively large number of data points. The higher levels with more data will provide more accurate position bias due to the larger data set, but the bias values may be less relevant to a particular offer as they include data for many different offers. Accordingly, the model trained using the data can include terms for each of these levels with a corresponding weighting factor that can be learned through the training and/or computer learning process, such that the relative weighting of the position data at each level can be used to determine the appropriate contribution to the position bias for a particular offer.

Figure 6:
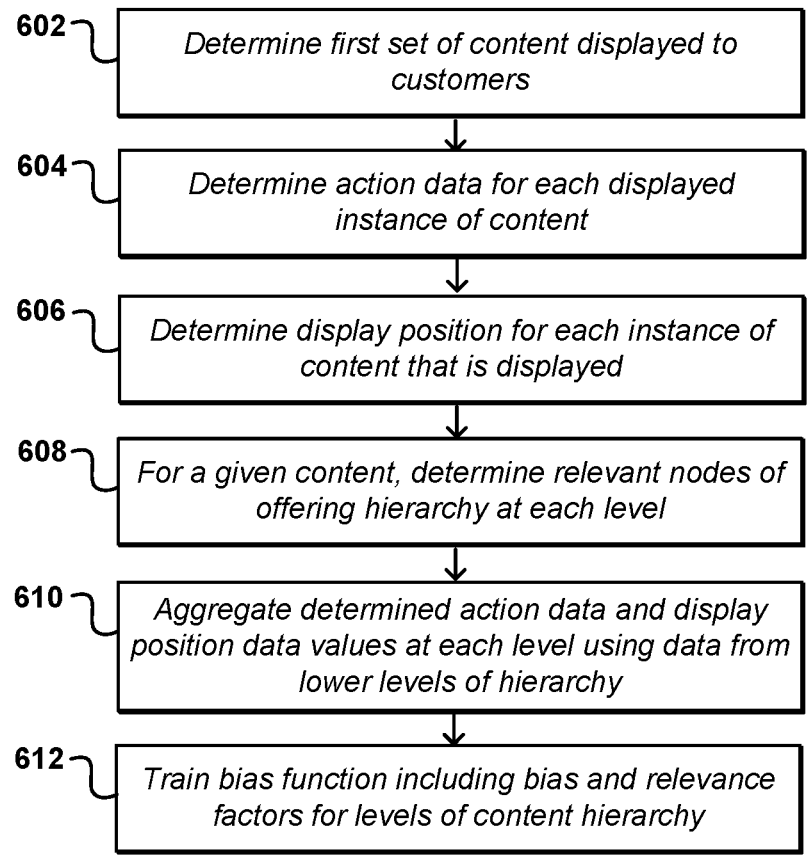
FIG. 6 illustrates an example process for determining position bias using data from various levels of a content hierarchy that can be utilized in accordance with various embodiments.

FIG. 6 illustrates an example process 600 for training a model using data for such a content hierarchy that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a first set of content displayed to customers can be determined 602. This can include, for example, determining a set of content displayed over a period of time for which action and position data is available and that should serve as a training set for one or more future instances of content. Once the set is determined, the action data for each instance of content can be determined 604, as well as the corresponding position data 606. As mentioned, the action data can include information such as information about displays or impressions; of views, clicks or selections; and purchases or conversions, among other such options. The position data can also include information about the position where content was displayed for each instance. The position data can be defined based upon specific locations or portions of content, such as a center (or centroid) position, an upper left coordinate, a boundary region, or other such designation. The position data with respect to the page or display can be defined in a number of different ways, which can be relative to the screen or relative to the page, among other such options. In some embodiments the position data can be relative to the page, but this might be inadequate if the zoom level or viewing area of the screen is such that a portion of the page is never displayed. The position relative to the screen can also be used, but the display area for the page might be less than the screen size such that a center location of the page is offset from a center location of the screen. Accordingly, approaches in accordance with various embodiments can attempt to determine the viewable or displayed area of the page, and then determine position data relative to the bounds of the displayed area. These can include coordinate positions, percentage values, specified zones, dominant regions, or other such designations. The designations can depend at least in part upon the desired level of granularity, as an array with 10×7 possible regions may require much fewer data points and less precision than a situation where the position bias is to be defined by a function where a specific pixel location can be provided as input, for example.

When training a bias model using the determined data set, the data for particular content can be analyzed and the relevant nodes of the content hierarchy determined 608. As mentioned, this can include determining the relevant sub-category, category, and global classification in one example, although the various categories and classifications can depend on the organization of the hierarchy. Further, in some embodiments the analysis does not need to include data for every level of the hierarchy, but can include a fixed number of levels, nodes up to a certain level, nodes until a minimum amount of data is available, etc. Once the appropriate nodes are determined, the action and position data can be aggregated 610, or rolled up from child nodes, for each of those nodes determined nodes. The bias function or model can then be trained 612 using the data for each of the levels. As discussed, this can include determining the relevance and bias values for each level of the hierarchy, then using the relative weightings from the model to determine the appropriate position bias factor for a specific instance of content.

Figure 7:
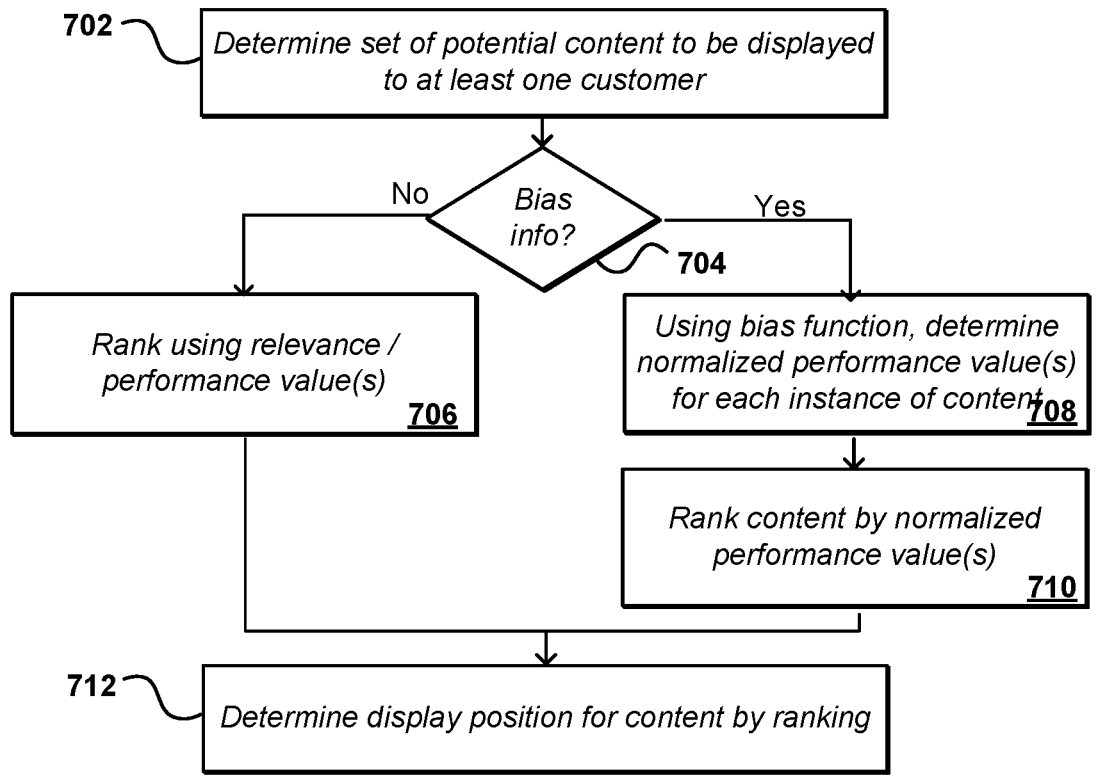
FIG. 7 illustrates an example process for determining normalized performance data for a set of content for use in determining positions for content display that can be utilized in accordance with various embodiments.

FIG. 7 illustrates an example process 700 for determining a selection, ranking, and/or arrangement of content to be displayed using a position bias model in accordance with various embodiments. In this example, a set of potential content (such as deals or offers) to be displayed for at least one customer can be determined 702. The content can include content for items to be recommended to a customer, items corresponding to a search request, or items to be suggested as a set of deals to a number or set of customers, among other such options. The set can be determined based upon factors such as relevance, among other such factors. A determination can be made 704 as to whether position bias information is available. This can include, for example, whether one or more bias models exist that are both properly trained and relevant to the determined content. For a new set of content, or content for new categories, there might not be sufficient position data available. In other instances there may not be a trained bias model available, among other such possibilities. If the bias information is not available, the content for the content can be ranked 706 using conventional mechanisms, such as ranking by relevance and/or performance values, even though performance values for the ads may include some position bias as discussed herein. Using the appropriate trained bias function or model, one or more normalized performance values can be determined 708 for each instance of content, or at least a subset of the content. The performance values to be normalized can depend at least in part upon the rules or policies for the deals, such as to rank or prioritize based on clicks, cart adds, or purchases, among other such options. Once the normalized values are obtained, the content can be ranked 710 by the normalized values. The display positions for the content can then be determined 712 based at least in part upon the ranking. This can include, for example, determining a subset of the content for an initial display. Since certain areas or display positions will be most likely to result in an action, the highest ranked instance of content can be placed in the most likely action position, followed by the next highest ranked instance of content, and so on. In some embodiments, the type of arrangement used for the display can also be determined based at least in part upon the normalized performance values and other such information.

Figure 8:
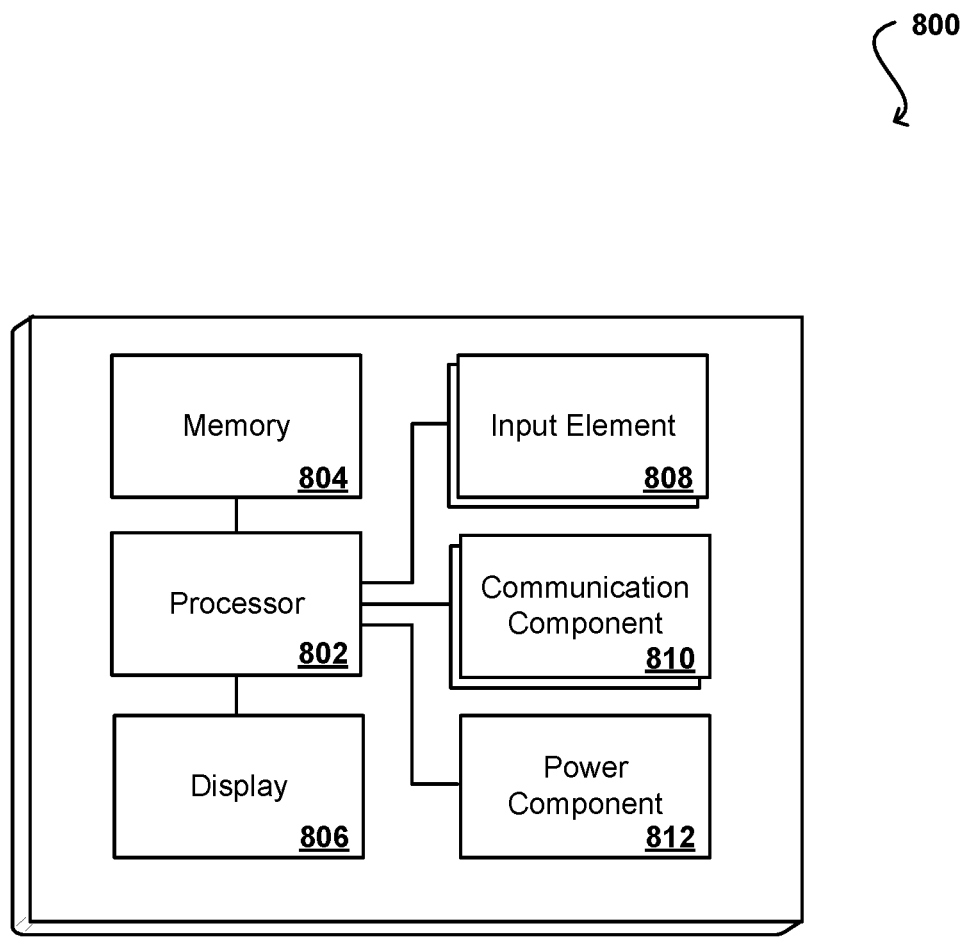
FIG. 8 illustrates example components of a computing device that can be utilized in accordance with various embodiments.

FIG. 8 illustrates a logical arrangement of a set of general components of an example computing device 800 that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    obtaining, by at least one processor, performance data and position data for each instance of content of a first set of content displayed through an electronic marketplace, the performance data indicating a number of actions taken for a respective offer with respect to a number of times the respective content was displayed, the position data indicating a respective display position for each of the times the respective content was displayed;
    correlating, by the at least one processor, the performance data and the position data for a respective content, of the first set of content, with one or more corresponding categories of a content hierarchy, the performance data of a respective category at a respective level of the content hierarchy including the performance data and the position data for all child sub-categories and content corresponding to that respective category;
    training, by the at least one processor, a bias model comprising layers of nodes for specified content of the first set of content using the performance data and the position data for the specified content and for corresponding categories of the levels of the content hierarchy to generate a position bias factor for the specified content;
    receiving a request to display a second set of content through the electronic marketplace, the second set of content including the specified content;
    determining, by the at least one processor and using the position bias factor and the performance data for the specified content, a normalized performance value for the specified content;
    ranking, by the at least one processor, the specified content against other content of the second set using the normalized performance value; and
    determining, by the at least one processor, display positions for the content of the second set to be displayed according to the ranking.

2. The computer-implemented method of claim 1, further comprising:
    determining, by the at least one processor, respective normalized performance values for the other content of the second set of content; and
    ranking, by the at least one processor, the specified content against the other content further using the respective normalized performance values.

3. The computer-implemented method of claim 1, further comprising:
    determining, by the at least one processor, a type of layout to be used to display the second set of content;
    determining, by the at least one processor, respective position bias values for each content display location of the type of layout; and
    causing, by the at least one processor, a highest ranked instance of content of the second set to be displayed in a display location having a position bias value indicative of a highest likelihood of an action occurring for content displayed at the display location.

4. The computer-implemented method of claim 1, further comprising:
    determining, by the at least one processor, the second set of content from a plurality of available content based at least in part upon respective relevance values for the plurality of available content with respect to the request to display the second set of content.

5. The computer-implemented method of claim 1, wherein the bias model is one of a Beta-Poisson model or a hierarchical prior (HIER) model.

6. A computer-implemented method, comprising:
    training, by at least one processor, a bias model comprising layers of nodes for an instance of content of a set of content to be displayed using performance data and position data for the instance of content and using one or more categorizations for the instance of content, each of the one or more categorizations including additional performance data and additional position data for additional instances of content from the set of content, the bias model generating a position bias factor for the instance of content, the position bias factor indicating a contribution to values of the performance data corresponding to a display position for each presentation of the instance of content;
    determining, by the at least one processor and for each instance of content of the set of content, a normalized performance value based at least in part upon a respective performance value and a respective position bias factor for the instance of content using the bias model for each instance of content; and selecting, by the at least one processor, display positions for at least a subset of the set of content based at least in part upon the respective normalized performance values.

7. The computer-implemented method of claim 6, further comprising:
obtaining, by the at least one processor, the performance data and the position data for the instance of content of the set of content, the performance data indicating a number of actions taken for the instance of content having an offer with respect to a number of times the instance of content was displayed, the position data indicating a display position for each of the number of times the instance of content was displayed; and
training, by the at least one processor, the bias model for the instance of content using the performance data and the position data to generate the position bias factor for the offer.

8. The computer-implemented method of claim 6, further comprising:
determining, by the at least one processor, the one or more categorizations by traversing links between nodes of a content hierarchy in the layers of nodes, each of the one or more categorizations for the instance of content corresponding to a different level of the content hierarchy.

9. The computer-implemented method of claim 6, further comprising:
ranking, by the at least one processor, instances of content of the set of content using the respective normalized performance values; and
selecting, by the at least one processor, the display positions based further upon values of the ranking.

10. The computer-implemented method of claim 6, further comprising:
determining, by the at least one processor, the performance data using a number of actions initiated for the instance of content with respect to a number of times the instance of content was displayed.

11. The computer-implemented method of claim 10, wherein the actions include at least one of views, interactions, selections, or requests for additional related content.

12. The computer-implemented method of claim 10, wherein the additional instances of content include offers for items available for consumption, and wherein the actions include at least one of accepting an offer, purchasing an item, or causing the offer to be added to a virtual shopping cart.

13. The computer-implemented method of claim 6, further comprising:
determining, by the at least one processor, a reference point for each presentation of the instance of content, the reference point including at least one of a centroid, a corner, or a boundary of the content as displayed, the reference point used to identify the display position with respect to a display region.

14. The computer-implemented method of claim 13, wherein the display region is one of a page, a window, a display screen, or a viewable area.

15. The computer-implemented method of claim 13, wherein the display position for presentation of the instance of content is determined based upon at least one of a coordinate, a cell, a percentage, or a zone of the display region.

16. The computer-implemented method of claim 6, wherein the bias model is one of a Beta-Poisson model or a hierarchical prior (HIER) model.

17. The computer-implemented method of claim 6, further comprising:
using, by the at least one processor, bias-corrected performance data as a target variable in one or more machine learning models for determining the position bias factor.

18. A system, comprising:
at least one processor; and
memory including instructions that, when executed by the at least one processor, cause the system to:
train a bias model comprising layers of nodes for an instance of content of a set of content to be displayed using performance data and position data for the instance of content and using one or more categorizations for the instance of content, each of the one or more categorizations including additional performance data and additional position data for additional instances of content from the set of content, the bias model generating a position bias factor for the instance of content, the position bias factor indicating a contribution to values of the performance data corresponding to a display position for each presentation of the instance of content;
determine, for each instance of content of the set of content, a normalized performance value based at least in part upon a respective performance value and a respective position bias factor for the instance of content using the bias model for each instance of content; and
cause at least a subset of the set of content to be displayed at display positions selected at least in part using the respective normalized performance values.

19. The system of claim 18, wherein the instructions when executed further cause the system to:
obtain the performance data and the position data for the instance of content of the set of content, the performance data indicating a number of actions taken for the instance of content having an offer with respect to a number of times the instance of content was displayed, the position data indicating a display position for each of the number of times the instance of content was displayed; and
train the bias model for the instance of content using the performance data and the position data to generate the position bias factor for the offer.

20. The system of claim 18, wherein the instructions when executed further cause the system to:
rank instances of content of the set of content using the respective normalized performance values; and
select the display positions based further upon values of the ranking.

* * * * *

UNITED STATES PATENT AND TRADEMARK OFFICE
CERTIFICATE OF CORRECTION

PATENT NO. : 10,497,012 B1  
APPLICATION NO. : 15/073289  
DATED : December 3, 2019  
INVENTOR(S) : Anirban Majumder, Prakash Mandayam Comar and Srinivasan Sengamedu Hanumantha Rao Page 1 of 1

It is certified that error appears in the above-identified patent and that said Letters Patent is hereby corrected as shown below:

On the Title Page

Item (72), Third Inventor, should read:
Srinivasan Sengamedu Hanumantha Rao

Signed and Sealed this
First Day of December, 2020

Andrei Iancu
*Director of the United States Patent and Trademark Office*